July 29, 1952

J. F. KOEHLER 2,605,461

RADIO ECHO DETECTION SYSTEM

Filed May 16, 1945

Inventor
JAMES F. KOEHLER
By Ralph L. Chappell
Attorney

July 29, 1952   J. F. KOEHLER   2,605,461
RADIO ECHO DETECTION SYSTEM
Filed May 16, 1945   3 Sheets-Sheet 2

Inventor
JAMES F. KOEHLER
By Ralph L. Chappell
Attorney

July 29, 1952  J. F. KOEHLER  2,605,461
RADIO ECHO DETECTION SYSTEM
Filed May 16, 1945  3 Sheets-Sheet 3

Inventor
JAMES F. KOEHLER

Patented July 29, 1952

2,605,461

UNITED STATES PATENT OFFICE 2,605,461

RADIO ECHO DETECTION SYSTEM

James F. Koehler, Chevy Chase, Md., assignor, by mesne assignments, to the United States of America as represented by the Secretary of the Navy Application May 16, 1945, Serial No. 594,044

24 Claims. (Cl. 343—11)

This invention relates to radio echo detection apparatus, and especially to cathode ray tube indicators which may be used therewith.

In the art of radio echo detection, electromagnetic radiation, usually at high frequency having waves measured in centimeters, is directed in a relatively narrow beam out into space and this beam is caused to scan a given field. Upon striking an object in space this radiation is reflected back to the source and may be received there. The velocity of such radiation is the same as that of light and is approximately 186,000 miles per second. If, then, the time required for the electromagnetic wave to leave the transmitter, travel to the object in space, and be reflected back again to the transmitter be measured, this time interval will give an accurate indication of the distance between the object and the transmitter. If, at the same time, the direction of the beam when the signal is reflected back is noted, this provides an indication of the direction of the object from the transmitter.

Such a system has been used with a directional antenna, mounted to rotate about a vertical axis, so that the beam of radiation projected from the antenna system may be made to scan an angle of 360° around the axis. The vertical angle of the directional antenna in such a system is adjusted as desired and then not changed when the system is operating, so that the field is scanned in one coordinate.

With such a system a cathode ray tube has been used for the indication, the reflected signal causing a spot of light to appear on the face of the tube. The angle of a radial line through this spot with respect to some reference radial line then may be made to represent the angular direction of the object with respect to a predetermined reference line perpendicular to the rotating axis of the antenna system. The distance of the spot of light from the center of the tube can be made proportional to the range or distance between the object and the transmitter. The deflection of the electron beam in such an indicating tube has in the past been controlled by a magnetic yoke surrounding the neck of the tube and rotated in synchronism with the rotation of the antenna system.

It is an object of this invention to provide a means for producing a radial sweep of the electron beam of a cathode ray tube which may be made to rotate about the center of the tube at any desired angular velocity.

It is another object of this invention to provide a means for producing a repeated radial sweep of the electron beam of a cathode ray tube which may be made to rotate about the center of the tube screen at any desired angular velocity and with means for accurately centering the beam on the tube screen between successive radial sweeps.

It is another object of this invention to provide a means for producing a repeated radial sweep of the electron beam of a cathode ray tube which may be rotated about the center of the tube screetn and is readily capable of being synchronized with a remotely displaced moving element.

Other objects and features of the present invention will become apparent upon a careful consideration of the following detailed description of the invention. It is to be understood, however, that the teachings of this invention can be extended beyond the application to radio echo apparatus and is therefore not to be restricted except insofar as is dictated by the appended claims.

Figures 1, 2:
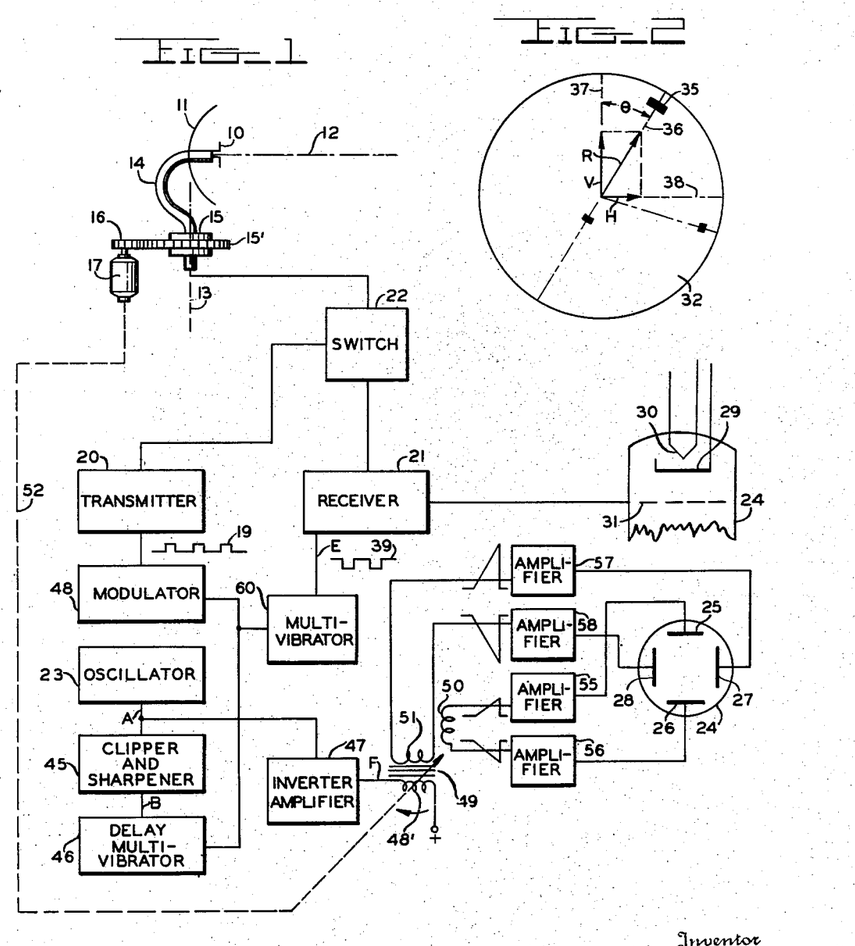
Fig. 1 is a schematic diagram partly in block of one embodiment of the present invention as applied to the conventional cathode ray tube.
Fig. 2 is a front view of a cathode ray tube showing the manner in which the beam deflection forces operate to produce the desired radial sweep.

Referring now more particularly to Fig. 1 of the drawings, a radiator 10 for electromagnetic waves, as, for instance, a dipole, is shown mounted in a suitable reflector 11, such as a paraboloid, in such a position as to direct a beam 12 of electromagnetic radiation having an axis indicated by the dot and dash line. The radiator 10 and reflector 11 are mounted to rotate about an axis 13 which may be substantially vertical. For this purpose a coaxial line 14 which delivers energy to the radiator 10 is shown curved, so as to be aligned with the axis 13 at a suitable rotating joint 15 through which it passes, for permitting rotation of the radiator 10 and reflector 11 without disturbing the connection. The reflector 11 is shown supported upon the coaxial line, although, of course, any means of supporting the reflector to permit rotation about the axis may be used. The rotation of the radiator 10 and reflector 11, which constitute the antenna system, may be accomplished by means of meshing gears 15 and 16, the former being secured to the coaxial line 14 and the latter to the shaft of a driving motor 17.

Any other means of mounting the radiator and reflector so as to cause the beam 12 to scan substantially a 360° angle about the axis 13 may be used, as well as any other type of directional antenna system, it being understood that the arrangement shown in the figure is merely illustrative and not intended to limit the invention to any particular form or apparatus.

The radiator 10 is connected either to a transmitter 20 or to a receiver 21 by means of a switch device 22 which connects the transmitter to the radiator 10 and effectively disconnects the receiver when the transmitter is operating, but connects the receiver to the antenna 10 and effectively disconnects the transmitter when the transmitter is not operating. Such a switch has been shown and described in the application of James L. Lawson, entitled "Protection of Receiver Against Overload," Serial Number 479,662, filed March 18, 1943. But separate antennas may be used, if desired, for the transmitter and receiver, although when separate antennas are used, care should be taken to mount them so as to get a minimum of interference in the receiver antenna when the transmitter is operating.

The transmitter 20 is arranged to produce a high frequency oscillation, such as one usually measured in centimeters, and is arranged to produce this oscillation in short pulses at a predetermined recurrence rate, so that it is not on continuously, but is operating during the period of a pulse only, and is off in the interval between pulses.

The rate of the transmitted pulses is determined by the oscillator 23 which is connected to the transmitter 20 through a modulator 48 in a manner later to be described. The latter produces accurately timed pulses, indicated at 19, which cause the transmitter to operate for the time duration of each pulse. There are a large number of these pulses for each complete 360° scan of the electromagnetic beam.

The oscillator 23 is also used to control the deflection of the electron beam in a cathode ray tube 24, portions of which are indicated diagrammatically in cross section at the right of the figure. An electrostatic deflection tube is represented, the neck being shown diagrammatically in transverse cross section disclosing the vertical deflecting plates 25 and 26 and the horizontal deflecting plates 27 and 28. These are positioned in a known manner in the neck of the tube the end of which is represented in longitudinal cross section to show the cathode 29, the heating element 30, and the control grid 31. The latter is connected to the output of the receiver 21 which is arranged so that received signals will swing the potential of the grid 31 in a positive direction or the cathode 29 in a negative direction to increase the intensity of the electron beam. It will be understood that the invention is not limited to the use of an electrostatic deflection tube. For example a magnetic deflection tube may be used.

In the system of the invention, it is desired to control the electron beam of the cathode ray tube 24 in such a manner that every time a pulse of the high-frequency oscillation produces electromagnetic radiation from the antenna system 10—11, the electron beam of the cathode ray tube will start from the center of the tube and move outwardly at a predetermined rate towards the circumference of the tube, following a radial line, and it is desired that this radial line shall correspond in direction to the direction in which the antenna system 10—11 is pointing. Then, when a reflected signal is picked up by the receiver 21 to swing the potential of the grid 31 of the cathode ray tube positively causing a spot of light to be formed on the fluorescent screen 32 of the tube along this radial line, as, for instance, the spot 35, on the radial line 36 in Figure 2. This spot will appear at a distance from the center of the tube corresponding to the time required for the pulse to move out from the antenna system 10—11, reach the object in space, and be reflected back again to the antenna system, or, in other words, this distance will correspond to the range of the object. At the same time the angle $\theta$ between the radial line 36 and another radial line, as, for instance, the vertical line 37, will represent the orientation of the antenna with respect to a given direction such as true north, for example.

Movement of the electron beam of the cathode ray tube along these radial lines may be accomplished by providing two forces acting on the beam at right angles to each other. A vector diagram of such forces is indicated in Figure 2. If the solid line H represents the vector of the force tending to move the beam horizontally to the right and the solid line V represents the vector of the force tending to move the electron beam in a vertical direction towards the top of the tube, then the solid line R will represent the vector resultant of forces H and V. It will be understood that, regardless of the angle $\theta$ these vectors will always maintain the relation: $V^2+H^2=R^2$. Also, it will be evident that if the force R is to be maintained constant as the angle $\theta$ changes, then H must always equal R sine $\theta$ and V must always equal R cosine $\theta$. Therefore, by varying the forces H and V, respectively, with the sine and cosine functions of the angle through which the radiated electromagnetic beam moves, the radial sweep of the beam can be made to rotate correspondingly.

Where an electrostatic cathode ray tube is used, as is shown, the voltages applied to the deflecting plates of the cathode ray tube will be caused to vary in a predetermined manner each time a pulse is transmitted from the antenna system. These voltages may be the rising linear portion of a sine wave or a saw-tooth voltage applied in push-pull, so that as a positive rising voltage is applied to the deflecting plate 26, a negatively decreasing voltage will be applied to the plate 25, these two voltages being equal in amplitude though opposite in sign.

Now, as the antenna system 10—11 rotates, the amplitude of the voltage waves applied to the two pairs of deflecting plates is changed in proportion to the movement of the antenna 10 in such a manner that the vector R in Figure 2 is always held constant regardless of the angle $\theta$. If we assume that the antenna 10 is pointing straight ahead in Figure 1 and that in that direction we want the electron beam to move on the vertical radial line 37 towards upper edge of the cathode ray tube, then, at this point, when a pulse leaves the antenna 10, the voltages applied to the deflecting plates 25 and 26 will have a maximum difference in value, that of the plate 26 being positive and that of the plate 25 being negative, while the voltages applied to the deflecting plates 27 and 28 will have a minimum difference, or, in other words, will be at the same potential. This will cause the electron beam to move from the center towards the circumference of the tube on the radial line 37.

But now, as the antenna moves in a clockwise direction to scan the horizon, the amplitude difference of these successive voltage waves which are applied to the deflecting plates 25 and 26 is caused to decrease while the amplitude difference between those applied to the plate 27 and 28 is caused to increase. When the 90° angle is reached the voltages on the deflecting plates 27 and 28 will have reached their maximum potential difference, with the plate 27 receiving the positive voltage wave and the plate 28 receiving the negative voltage wave, while the deflecting plates 25 and 26 will have zero difference in voltage between them. This will cause the electron beam to follow the horizontal line 38 and move towards the right from the center out toward the circumference of the tube.

Upon further rotation of the antenna 10, the difference in potential of the voltage waves applies to the deflecting plates 27 and 28 is caused to decrease and the difference in potential of the voltage waves on the plates 25 and 26 to increase with the voltages applied in the opposite sense. Thus, when the antenna 10 is pointing in the opposite direction from that shown in the figure, a maximum voltage wave will be applied to the deflecting plate 26, while a voltage wave of the opposite sense will be applied to the plate 25. At the same time there will be no voltage difference between the deflecting plates 27 and 28 and the electron beam will move from the center down towards the lower edge of the face of the tube. If the amplitudes of these voltage waves applied to the plates are thus varied proportionately, those of the vertical plates increasing or decreasing with the cosine of the angle as the voltages on the other plates are decreasing or increasing with the sine of the angle, the electron beam may be made to trace a succession of radial lines around the face of the tube, the angular movement of the trace being synchronized with the movement of the antenna.

Figure 3:
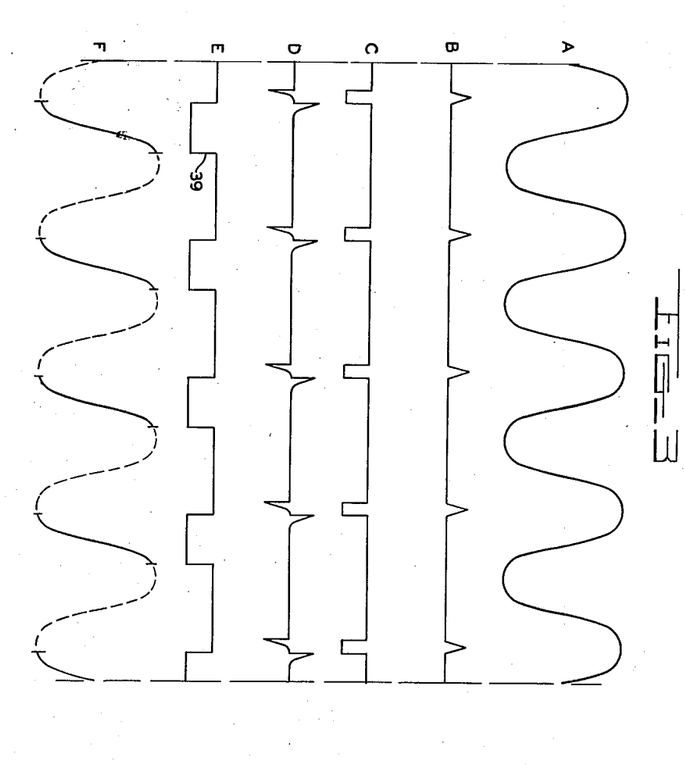
Fig. 3 is a series of voltage time plots taken to illustrate the operation of Fig. 1.

One manner of producing a rotating radial sweep is illustrated in Figure 1. Here the oscillator 23, which may be of the Wein bridge type, is adjusted to operate, say, at 2,000 cycles per second and produces a sine wave voltage output somewhat as shown at A in Figure 3, which is applied in parallel to a clipper and sharpener amplifier 45 and to an inverter amplifier 47. The latter, which may be an ordinary beam power tube, has the rotor winding 48' of a rotary transformer 49 serially connected in its plate circuit so that a voltage wave of a phase opposite to the phase of the oscillator output will be developed there across as shown at F in Figure 3. The clipper and sharpener amplifier 45 is of known design arranged to clip off the very positive peaks of the sine wave output from the oscillator 23 and to amplify these peaks sufficiently to produce sharp positive keying pulses as shown at B in Figure 3. These positive keying pulses actuate the delay multivibrator 46 which produces as shown at C in Figure 3 a negative voltage pulse of a time duration such that its trailing edge coincides with the start of the linear rising portion of the sine wave voltage developed across the rotor 48' of the transformer 49. This negative voltage pulse is then differentiated, by means not shown, so that the leading and trailing edges thereof produce, as shown at D in Figure 3, negative and positive voltage "pips" which are fed in parallel to the modulator 48 and multivibrator 60, both of which are designed to operate in response to the positive voltage "pips." The former operates to produce in a known manner, the fixed time duration positive pulses 19 which key the transmitter 20. The multivibrator 60 operates to produce the negative unblanking pulses 39, as shown at E in Figure 3, which are applied to the receiver 21 to unblock the latter and thereby render visible only that movement of the cathode ray tube beam that is caused by the linear rising portion, as shown by the solid line in plot F of Figure 3, of the sine wave voltage appearing across the rotor 48' of the rotary transformer 49.

The rotary transformer 49 has a rotatable primary winding 48' which is adapted to be rotated about an axis substantially perpendicular to the axes of the winding. The winding 48' is also substantially symmetrical about the axis of rotation. The transformer has two secondary windings 50 and 51 arranged with their axes at right angles to each other, in a plane which is substantially perpendicular to the axis of rotation. The rotary winding 48' may be arranged in any desired manner to be rotated by the rotating mechanism, which controls the scanning of the antenna 10. For purposes of illustration this rotational connection has been indicated by the dotted line 52, and it will be understood that this may be a direct mechanical connection or a connection through synchronous motors to cause the rotor 48' to follow the movement of the antenna 10, as the latter scans about the vertical axis 13. The ends of the secondary winding 50 are connected to separate amplifiers 55 and 56, the outputs of which are connected respectively to the deflecting plates 25 and 26, while the ends of the secondary winding 51 are connected to amplifiers 57 and 58, the outputs of which are connected respectively to the horizontal deflecting plates 27 and 28.

When the rotor 48' is parallel with the secondary 51, as indicated in the drawing, the plates 27 and 28 will receive the maximum amplitude of the sine wave voltage. At this time the secondary 50 is at right angles to the rotor 48' and will receive minimum or zero amplitude of the voltage wave. As the rotor 48' rotates, however, the amplitude of the horizontal deflecting plate voltages will decrease in proportion to the sine of the angle of rotation and the amplitude of the voltage on the vertical plates will increase in proportion to the cosine of the angle until the primary 48' is parallel with the secondary 50, at which time the vertical plates will receive a maximum amplitude of the voltage wave and the horizontal plates will receive a minimum amplitude of this wave, since the rotor 48' will be at right angles to the secondary 51.

The operation of this system will be understood from the description already given. A pulse sent out from the antenna 10 will travel out into space in the direction in which the antenna system is pointing and if it strikes an object in space will be reflected back, being picked up by the antenna in the interval between pulses, the pulses being spaced sufficiently in time duration to permit the reception of the reflected pulse before the next pulse is sent out. At the same time that the pulse is sent out from the antenna the multivibrator 60 is operated to unblock the receiver 21 during the linear rising portion of the sine wave voltage developed across the rotor 48' of the transformer 49. The voltages produced by induction in the secondaries 50 and 51 will have their amplitudes determined by the position of the rotor 48' which is in turn determined by the position of the antenna 10. Hence the visible movement of the electron beam will be on a radial line which is determined by the position of the antenna. When the signal is received back by reflection from the object in space, it will intensify the electron beam, with the result that a spot of light will appear on that particular radial line at a distance from the center corresponding to the range of the object. By means of the multivibrator circuit 60 the response of the receiver is made effective during the linear rising portion of the sine wave voltage G only, so that signals received at any other time will not appear on the face of the cathode ray tube. In such a case, what happens to the electron beam between the leading edges of the sine wave voltage F is unimportant.

Figure 4:
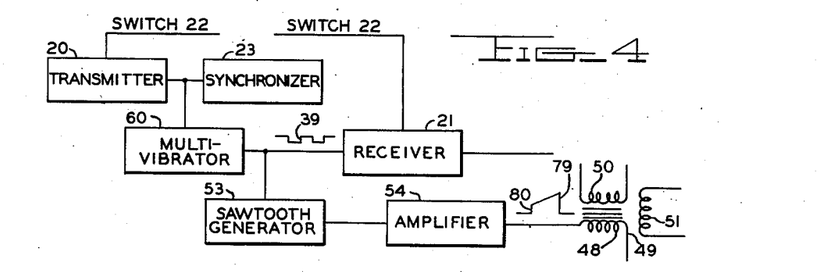
Fig. 4 is a schematic diagram of one possible modification of the invention.

A second embodiment of this invention is illustrated in Figure 4, wherein the radial sweep is obtained through the use of a saw-tooth voltage wave. Here a synchronizer 23' is provided, and arranged to produce the keying pulses 19, shown in Figure 1, for operating both the transmitter 20 and the multivibrator 60. The latter, applies the negative unblanking pulse 39 in parallel to the receiver 21 and to the saw-tooth voltage generator 53. This saw-tooth voltage generator is preferably of a type hereinafter described and generates a saw-tooth voltage equal in time duration to the multivibrator pulse 39, which is applied through the power amplifier 54 to the rotor 48' of the rotary transformer 49.

Where it is desired to force a current in the form of a saw-tooth wave through an inductance the wave applied to the inductance must be distorted somewhat to counteract the current induced in the inductance at the inception of the saw-tooth wave. This distorted wave will correspond to wave 79 with a steep front 80 at the leading edge thereof shown in Figure 5. If the steep front is not provided on the saw-tooth wave, the current in the inductance will lag as the saw-tooth wave starts and will therefore not have a linear rise at the start. A circuit for producing a steep front saw-tooth voltage wave has been indicated in Figure 5.

Figure 5:
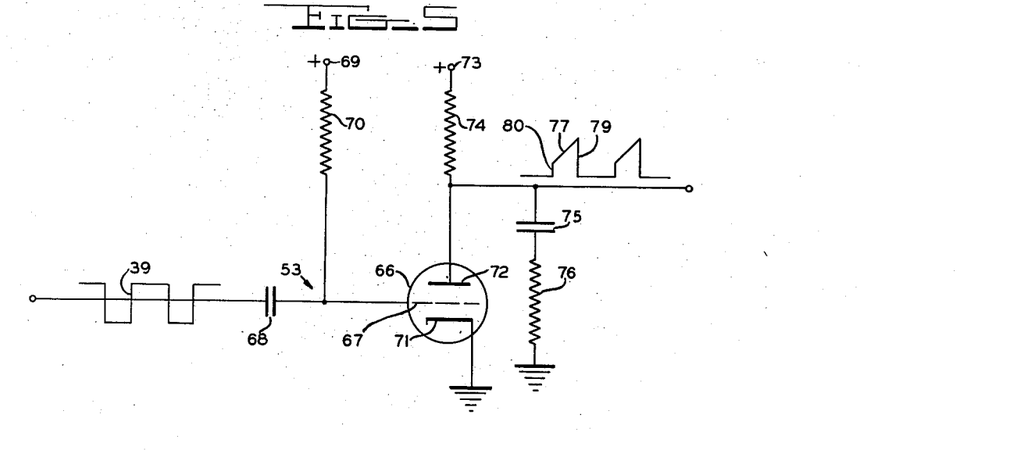
Fig. 5 is a circuit diagram of a particular type saw-tooth wave generator found desirable for producing a saw-tooth current which is to be passed through an inductance.

This saw-tooth generator may comprise a tube 66, which is a simple triode having a grid 67 to which is applied the unblanking pulses 39 derived from the multivibrator 60 through a suitable coupling condenser 68. The tube 66 is biased normally conducting by virtue of a positive potential applied to the grid 67 from a source indicated at 69 through resistance 70. The cathode 71 is connected directly to ground while the plate 72 is provided with a source of positive potential 73 through a load resistance 74. There is also provided with this circuit a serially connected condenser 75 and resistance 76 which in turn connected in shunt with tube 66 for a purpose which will become apparent hereinafter.

In operation of the circuit, tube 66 is normally conducting and plate 72 is very nearly at ground potential because of the low resistance of the tube at this instant. When grid 67 is driven negative by the leading edges of the square wave pulse, the plate 72 will suddenly rise in potential. Because of the voltage dividing action of resistances 74 and 76 the steep front 80 of the saw-tooth wave 79 will be formed. Thereafter the condenser 75 starts to charge and the plate voltage undergoes a gradual rise to produce the slope 77 on the saw-tooth voltage 79, whereupon the end or trailing edge of the negative pulse drives grid 67 positive again to render tube 66 conducting and thereby provide a path through which condenser 75 may rapidly discharge to produce the abrupt trailing edge of the saw-tooth voltage.

The amplitude of the saw-tooth voltage is directly proportional to the source 73 and hence may be adjusted, as desired, by adjusting the source.

Figure 6:
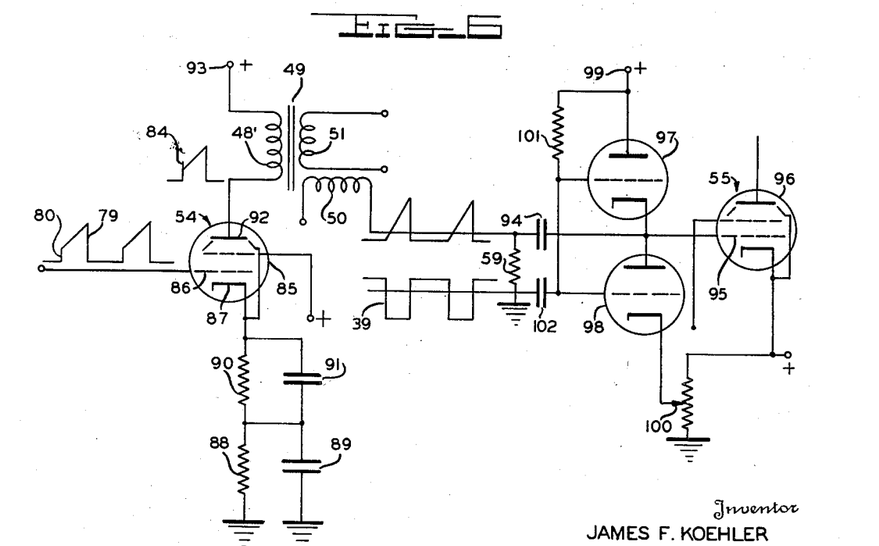
Fig. 6 is a circuit diagram of one method of centering the electron beam on the tube screen between the generation of successive radial sweeps.

One form of amplifier 54, used for coupling the saw-tooth waves to the rotor 48' of the transformer 49, is illustrated in Figure 6 and one of the succeeding amplifiers, for instance amplifier 55. From the description that follows it will be understood that a similar arrangement may be used to couple the sine wave drive, as obtained from the circuit shown in Figure 1, to the transformer 49. In the amplifier 54 a beam power tube 85 is shown with a grid 86 upon which is applied the saw-tooth voltage wave 79. The cathode 87 of tube 85 may be biased in any desired manner as by providing a long time constant resistor-condenser combination comprising the shunt connected resistance 88 and condenser 89. A resistor 90 may also be placed in the cathode circuit between the cathode and the resistor 88 shunted by a small condenser 91. The plate 92 is connected to one end of the primary winding 48' of the rotary transformer 49 while the other end of the primary winding is connected to a source of positive potential, indicated at 93.

Because of the capacity in the leads to the rotor of the transformer 49 and in the windings thereof it may be necessary to provide a small voltage pip 84 to the front or leading edge of the saw-tooth voltage in order to charge these capacities. This pip is provided by the small condenser 91 across the resistor 90 which effectively peaks the amplifier response at the steep leading edge 80 of the saw-tooth voltage 79. The saw-tooth voltage induced in the secondary winding 50 is applied through condenser 94 to the grid 95 of a beam power tube 96 which may constitute the amplifier 55. The end of winding 50 is tied to ground through a resistance 59 which resistance is substantially equal to another resistance in a similar amplifier circuit connected to the other end of winding 50, the two resistances functioning to effectively ground the mid-point of the winding 50.

Regardless of whether the radial sweep is derived from the linear portion of a sine wave or from a saw-tooth voltage wave, it is desired to have the electron beam start from the center of the tube for each sweep that it makes and since the various circuits are coupled by transformers or condensers, it is necessary to apply in some manner a direct current reference potential which will positively locate the electron beam at the center of the tube when the sweep begins. One simple manner of applying such a reference voltage has been indicated in Figure 6, this reference voltage being applied to the grid 95 of the power tube 96. This arrangement consists of two triode tubes 97 and 98, the cathode of the former and the plate of the latter being connected to the grid 95. The plate of the tube 97 is then given a positive potential of low voltage, as indicated at 99, and the cathode of the tube 98 is given the reference potential at which it is desired to start each saw-tooth wave or the linear rising portion of the sine wave as the case may be. This reference potential may be obtained by connecting the cathode of the tube 98 to the arm of a potentiometer 100, the resistance of which is connected between ground and the cathode of the tube 96, the latter cathode being given a low positive bias potential. The grids of the two tubes 97 and 98 are connected together and to the source of potential 99 through a resistance 101. These grids are then supplied through a condenser 102 with the negative square pulses 39 from multivibrator 60, this connection having been omitted in Figures 1 and 4 to avoid confusion.

Because of the positive potential on the grids of the tubes 97 and 98, these tubes will normally be capable of conducting and either will conduct whenever a suitable potential difference appears between its plate and cathode. Since the grid of the tube 98 will begin to draw current whenever its potential rises to the potential of the bias source 100, it will never greatly exceed this potential, and hence the grids of both tubes 97 and 98 are normally held at the bias potential. If this is so, it makes no difference whether the grid 95 of the tube 96 is positive or negative with respect to the bias potential 100; if it is negative, there will be plate-cathode current in the tube 97, and if it is positive, there will be plate-cathode current in the tube 98, and, in either case, the result will be that the grid 95 will be brought very nearly to the potential of the bias source 100.

As pointed out above, however, the negative unblanking pulses 39 which are obtained from the multivibrator 60 are applied through condenser 102 to the grids of tubes 97 and 98. These negative pulses are arranged to block both tubes 97 and 98 to thereby permit the grid of tube 96 to rise or fall in accordance with the driving voltage applied thereto. Thus in the case of a sine wave drive, the negative pulses 39 are timed by multivibrator 46 to block tubes 97 and 98 driving the linear rising portion of the sine wave voltage F developed across the rotor 48' of the rotary transformer 49, and in the case of a saw-tooth drive, the saw-tooth voltage is generated in response to the unblanking pulses 39 so that tubes 97 and 98 will be properly blocked in both cases. At the end of the unblanking pulses 39 tubes 97 and 98 are returned to conduction and therefore return the grid of tube 96 to the reference potential as set by the potentiometer 100.

In this clamping circuit the time constant of the resistance 101 and the condenser 102 should be greater than the recurrence time of the saw-tooth, in order to maintain the grids of the clamping tubes negative during the time that the clamping effect is not desired.

The resistance 101 should be sufficiently high so that the grid currents of the tubes 97 and 98 will not be large enough to harm the tubes. It will be noted that the potential through the resistance 101 helps pull the potentials of the grids of the tubes 97 and 98 up to the desired reference potential at which time the grid current in the tube 98 stops the further rise in potential. While large currents flow through all of the elements of the two tubes, the square pulse which controls the operation of the circuit like a gate need deliver very little current. The voltage clamping circuit together with certain modifications thereof, is claimed in an application filed by Chalmers W. Sherwin, entitled "Voltage Clamping Circuit," filed January 4, 1945, S. N. 571,316, now Patent No. 2,578,268, issued December 11, 1951.

It will be understood that there are four power amplifiers 55, 56, 57 and 58 as shown in Figure 1, each with a pair of clamping triodes for providing the voltages on the four deflecting plates of the cathode ray tube 24. The tube 96 has been shown in Figure 6 connected to one end of the secondary winding 50 of the rotary transformer 49.

It will be understood from the description of the various figures and the disclosure therein that I have provided a means to control the deflection of a cathode ray tube so as to cause the electron beam to sweep from a predetermined point on the face of the tube toward the circumference thereof every time a pulse of the high frequency oscillation is radiated from the antenna, and I have also provided a means to cause that sweep to rotate about this predetermined point on the face of the tube in synchronism with the rotation of the radiating antenna. By means of the invention either electrostatic or electro-magnetic deflection may be used and various ways of producing the sweep circuits have been shown and described.

Various modifications of the invention besides those shown and described may be used without departing from the spirit thereof, and I do not, therefore, desire to limit my invention except as it is limited by the appended claims.

What I desire to claim and secure by Letters Patent is:

1. A system of radio echo detection comprising, in combination, means to produce a concentrated beam of electromagnetic radiation, means to cause said beam to scan a field in space through a predetermined angle, a cathode ray tube, means to create a first field of force within said tube capable of acting on the electron beam of said tube to move said beam in a predetermined direction, means to create a second field of force within said tube capable of acting on said electron beam to cause it to move in a direction perpendicular to the direction in which said first field of force tends to cause it to move, means to vary said fields of force simultaneously and linearly with time, so as to cause said electron beam to sweep at a constant rate from a given point on the surface of the tube towards the periphery thereof, a rotary transformer means to cause one of said fields of force to vary sinusoidally, and the other co-sinusoidally so as to cause the direction of said electron beam with respect to said given point to change in proportion to the change of direction of said electromagnetic radiation, means to receive electromagnetic radiation reflected from an object in space, and means to cause the response of said receiving means to intensify said electron beam, whereby an indication of the bearing of said object relative to a given reference line is obtained.

2. A radiant energy locating system including in combination means for receiving radiant energy, rotatable means for limiting the reception of said radiant energy to a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a generator connected to said rotatable coil for inducing energy in quadrature phase in said fixed coils, and connecting means between said fixed coils and said deflecting elements for applying potentials to said deflecting elements for rotating said ray in synchronism with said rotatable means and for deflecting said ray in a radial direction.

3. A radiant energy locating system including in combination rotatable means for selectively receiving radiant energy throughout a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a sawtooth generator connected to said rotatable coil for inducing energy in quadrature phase in said fixed coils, and means effectively connected to said fixed coils and to said deflecting elements for applying potentials to said deflecting elements for rotating said ray in synchronism with said rotatable means and for radially deflecting said ray in synchronism with said sawtooth energy.

4. A radiant energy locating system including in combination rotatable means for receiving radiant energy throughout a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a pulse generator connected to said rotatable coil for inducing pulses in quadrature phase in said fixed coils, means effectively connected to said fixed coils and to said deflecting elements for applying potentials to said deflecting elements for deflecting said ray in synchronism with said rotatable means, and means for applying modifying potentials to said cathode ray tube to indicate reception of said radiant energy.

5. A radiant energy locating system including in combination rotatable means for receiving radiant energy throughout a predetermined angular range, a cathode ray tube for indicating the angular position at which said energy is received, said tube including elements for deflecting said ray throughout said range, a goniometer having a rotatable coil movable in synchronism with said rotatable means and having fixed coils disposed in operative relation to said rotatable coil, a generator connected to said rotatable coil for inducing energy in quadrature phase in said fixed coils, means connecting said fixed coils and said deflecting elements for applying potentials corresponding to said energy to said deflecting elements for deflecting said ray in synchronism with said rotatable means and for deflecting said ray in a radial direction, and means for applying said received radiant energy to said cathode ray tube whereby the ray is varied and reception of said radiant energy is indicated.

6. A radiant energy locating system including in combination rotatable means for receiving radiant energy throughout a predetermined angular range, a cathode ray tube for indicating the angular position at which said energy is received, said tube including elements for deflecting said ray throughout said range and an element for controlling said ray, a goniometer having a rotatable coil movable in synchronism with said rotatable means and having fixed coils disposed in operative relation to said rotatable coil, a generator connected to said rotatable coil for inducing energy in quadrature phase in said fixed coils, means connecting said fixed coils and said deflecting elements for applying potentials to said deflecting elements for deflecting said ray in synchronism with said rotatable means and for deflecting said ray in a radial direction, and means for applying said received radiant energy to said controlling element whereby reception of said radiant energy may be indicated.

7. A radiant energy locating system including in combination means for receiving radiant energy, rotatable means for limiting the reception of said radiant energy to a predetermined angular range, a cathode ray tube for indicating the angular position at which said energy is received, said tube including elements for deflecting said ray throughout said range and a control element for modifying said ray, a goniometer having a rotatable coil movable in synchronism with said rotatable means and having fixed coils disposed in operative relation to said rotatable coil, a generator connected to said rotatable coil for inducing energy in quadrature phase in said fixed coils, means connecting said fixed coils and to said deflecting elements for applying potentials to said deflecting elements for deflecting said ray in synchronism with said rotatable means and for directing said ray in a radial direction, and means for applying said received radiant energy to said cathode ray tube control element whereby said ray may be modified to indicate reception of said radiant energy.

8. A cathode ray deflecting system comprising two deflecting means which are angularly displaced with respect to each other and which are mounted on a cathode ray tube, a pair of windings which are similarly angularly displaced with respect to each other and which are connected to said two deflecting means, respectively, an auxiliary coil which is positioned in the plane of said windings for relative rotation with respect thereto, and means for supplying a sawtooth deflecting current to said auxiliary coil during said relative rotation whereby a rotating radial deflection of the cathode ray is produced.

9. A cathode ray deflecting system comprising, a cathode ray tube including deflecting elements which are angularly displaced with respect to each other, a rotary transformer having a rotatable coil and fixed coils similarly angularly displaced and connected to said deflecting elements, respectively, and a saw-tooth generator connected to said rotatable coil during rotation thereof for inducing energy in quadrature phase in said fixed coils whereby a rotating radial deflection of the cathode ray is produced.

10. A cathode ray deflecting system comprising at least two pairs of deflection plates mounted in fixed relation to a cathode ray tube and having a certain angular relation with respect to each other, a rotary transformer assembly having two fixed coils having the same angular relation to each other as said pairs of deflection plates and a rotatable coil, means coupling said fixed coils to said deflection plates, and means for applying a repeating sawtooth voltage signal of substantially constant amplitude to said rotatable coil during rotation thereof whereby a rotating radial deflection of the cathode ray is produced.

11. A radial sweep circuit for a cathode ray tube having orthogonally disposed deflection means comprising, a rotary transformer having a pair of fixed orthogonally disposed coils and a rotatable coil oriented in operative relationship with said fixed coils, means for applying a repeating sawtooth voltage signal of substantially constant amplitude to said rotatable coil, means for deriving from said fixed coils a pair of repeating sawtooth voltage signals respectively varying sinusoidally and cosinusoidally in amplitude, and means for applying said signals to said orthogonally disposed deflections means.

12. A radio echo detection system comprising, in combination, rotatable means for receiving radiant energy throughout a predetermined angular range, a cathode ray tube for indicating the angular position at which said energy is received, said tube including at least two pairs of deflection plates fixedly mounted thereon and having a certain angular relation with respect to each other, a rotary transformer assembly having two fixed coils having the same angular relation to each other as said pairs of deflection plates and a rotatable coil movable in synchronism with said rotatable means, means coupling said fixed coils to said deflection plates, and means for applying a repeating substantially linear time base voltage signal of substantially constant amplitude to said rotatable coil during rotation thereof whereby a rotating radial deflection of the cathode ray is produced.

13. A radio echo detection system comprising, in combination, a rotatable directive antenna for receiving radiant energy, a cathode ray tube for indicating the angular position of said antenna at which said energy is received, said tube including at least two pairs of deflection plates fixedly mounted thereon and having a certain angular relation with respect to each other, a rotary transformer assembly having two fixed coils having the same angular relation to each other as said pairs of deflection plates and a rotatable coil movable in synchronism with said rotatable antenna, means for applying a repeating linear time base voltage signal of substantially constant amplitude to said rotatable coil, means for deriving from said fixed coils a pair of repeating linear time base voltage signals respectively varying sinusoidally and cosinusoidally in amplitude, and means for applying said signals to said pairs of deflection plates.

14. A radio echo detection system comprising, in combination, rotatable means for receiving radiant energy throughout a predetermined angular range, a cathode ray tube having orthogonally disposed deflection means, a rotary transformer having a pair of fixed orthogonally disposed coils and a rotatable coil movable in synchronism with said rotatable means, means for applying a repeating sawtooth voltage signal of substantially constant amplitude to said rotatable coil, means for deriving from said fixed coils a pair of repeating sawtooth voltage signals respectively varying sinusoidally and cosinusoidally in amplitude, and means for applying said signals to said orthogonally disposed deflection means.

15. A radio echo detection system comprising, in combination, means for receiving radiant energy, a rotatable directive antenna for limiting the reception of said radiant energy to a predetermined angular range, a cathode ray tube including two deflecting means which are angularly displaced with respect to each other, a pair of windings which are similarly angularly displaced with respect to each other and which are connected to said two deflecting means, respectively, an auxiliary coil disposed in operative relation with said pair of windings and movable in synchronism with said rotatable antenna, means connected to said auxiliary coil for inducing repeating sawtooth voltage signals in quadrature phase in said windings whereby potentials are applied to said deflecting elements for deflecting the cathode ray in synchronism with said rotatable antenna, and means to cause the response of said receiving means to intensify said cathode ray to indicate the reception of said radiant energy and the direction from which it is received.

16. A radio echo detection system comprising, in combination, rotatable means for receiving radiant energy throughout a predetermined angular range, a cathode ray tube for indicating the angular position at which said energy is received, said tube including two deflecting means which are angularly displaced with respect to each other, a rotary transformer having a pair of fixed windings which are similarly angularly displaced with respect to each other and a rotatable coil movable in synchronism with said rotatable means, means effectively connecting said fixed windings and said deflecting means, and means for applying a sawtooth deflecting current to said rotatable coil during rotation thereof whereby a rotating radial deflection of the cathode ray is produced.

17. A radio echo detection system comprising, in combination, rotatable means for receiving radiant energy throughout a predetermined angular range, a cathode ray tube for indicating the angular position at which said energy is received, said tube including two deflecting means which are angularly displaced with respect to each other, a rotary transformer having a pair of fixed windings which are similarly angularly displaced with respect to each other and a rotatable coil movable in synchronism with said rotatable means, means effectively connecting said fixed windings and said deflecting means, a pulse generator connected to said rotatable coil for inducing repeating sawtooth voltage pulses in qudrature phase in said fixed coils whereby potentials are applied to said deflecting means for deflecting the cathode ray in synchronism with said rotatable means, and means for intensifying said cathode ray to indicate reception of said radiant energy.

18. A radio echo detection system comprising, in combination, rotatable means for receiving radiant energy throughout a predetermined angular range, a cathode ray tube for indicating the angular position at which said energy is received, said tube including two deflecting means which are angularly displaced with respect to each other, a rotary transformer having a pair of fixed windings which are similarly angularly displaced with respect to each other and a rotatable coil movable in synchronism with said rotatable means, means effectively connecting said fixed windings and said reflecting means, a sawtooth generator connected to said rotatable coil for inducing energy in quadrature phase in said fixed coils whereby potentials are applied to said deflecting means for rotating the cathode ray in synchronism with said rotatable means and for radially deflecting said ray in synchronism with said sawtooth energy, and means for intensifying said cathode ray to indicate reception of said radiant energy.

19. A radio echo detection system comprising, in combination, rotatable means for receiving radiant energy throughout a predetermined angular range, a cathode ray tube for indicating the angular position at which said energy is received, means for creating a first field of force within said tube capable of moving the cathode ray of the tube in a first direction, means for creating a second field of force within said tube capable of moving said cathode ray in a direction perpendicular to said first direction, means to vary said fields of force simultaneously and linearly with time whereby said cathode ray is swept at a constant rate from a given point on the face of said tube towards the periphery thereof, and a rotary transformer arranged to cause said first and second fields of force to vary sinusoidally and cosinusoidally, respectively, in synchronism with the rotation of said rotatable means.

20. A radio echo detection system comprising, in combination, means for generating a series of pulses of electromagnetic energy, rotatable means for producing a concentrated beam from said energy and scanning a field in space throughout a predetermined angular range, means coupled to said rotatable means for receiving electromagnetic radiation reflected from an object in space, a cathode ray tube for indicating the angular position at which said energy is received, said tube including two deflecting means which are angularly displaced with respect to each other, a rotary transformer having a pair of fixed windings which are similarly angularly displaced with respect to each other and a rotatable coil movable in synchronism with said rotatable means, a pulse generator synchronously operable with said pulsed energy generating means connected to said rotatable coil for inducing pulses in quadrature phase in said fixed coils, connecting means between said fixed coils and said deflecting means for applying potentials to said deflecting means for rotating said ray in synchronism with said rotatable means and for deflecting said ray in a radial direction in synchronism with said series of pulses, and means for intensifying said cathode ray to indicate reception of said reflected radiation.

21. A radio echo detection system comprising, in combination, means for generating a series of pulses of electromagnetic energy, rotatable means for producing a concentrated beam from said energy and scanning a field in space throughout a predetermined angular range, means coupled to said rotatable means for receiving electromagnetic radiation reflected from an object in space, a cathode ray tube for indicating the angular position at which said energy is received, said tube including two deflecting means which are angularly displaced with respect to each other, a rotary transformer having a pair of fixed windings which are similarly angularly displaced with respect to each other and a rotatable coil movable in synchronism with said rotatable means, a sawtooth generator arranged to produce a series of sawtooth pulses synchronously with said series of pulses and connected to said rotatable coil for inducing energy in quadrature phase in said fixed coils, connecting means between said fixed coils and said deflecting means for applying potentials to said deflecting means for rotating said ray in synchronism with said rotatable means and for deflecting said ray in a radial direction in synchronism with said sawtooth pulses, and means for applying modifying potentials to said cathode ray tube to indicate reception of said reflected radiation.

22. A radio echo detection system comprising, in combination, means to produce a concentrated beam of electromagnetic radiation, rotatable means to cause said beam to scan a field in space throughout a predetermined angular range, means to receive electromagnetic energy reflected from an object in space, a cathode ray tube for indicating the angular position at which said energy is received, said tube including two deflecting means which are angularly displaced with respect to each other, a rotary transformer having a pair of fixed windings similarly angularly displaced with respect to each other and a rotatable coil movable in synchronism with said rotatable means, a sawtooth generator connected to said rotatable coil for inducing energy in quadrature phase in said fixed coils, amplifiers connected between said fixed coils and said deflecting means for applying potentials to said deflecting means for rotating said ray in synchronism with said rotatable means and for deflecting said ray from the center of said tube in a radial direction in synchronism with said sawtooth pulses.

23. A radio echo detection system comprising, in combination, a transmitter for producing a series of pulses of electromagnetic radiation, a rotatable directive antenna for producing a concentrated beam from said energy and scanning a field in space throughout a predetermined angular range, a receiver, means connecting said receiver to said antenna during the period between said series of pulses for receiving electromagnetic radiation reflected from an object in space, a cathode ray tube including a control grid and two deflecting means which are angularly displaced with respect to each other, a rotary transformer having two fixed coils and a rotatable coil coupled to said antenna and movable in synchronism therewith, a sawtooth generator arranged to generate a series of sawtooth voltage pulses during the periods between said series of pulses and connected to said rotatable coil for inducing energy in quadrature phase in said fixed coils, amplifiers connecting said fixed coils and said deflecting means for applying potentials to said deflecting means for rotating the ray of said tube in synchronism with said antenna and in a radial direction in synchronism with said sawtooth pulses, means connecting said receiver to the control grid of said tube, and means for applying a voltage to said control grid during the period of each sawtooth voltage pulse for intensifying said cathode ray whereby the reception of said reflected radiation is indicated.

24. A radio echo detection system comprising, in combination, means to produce a concentrated beam of electromagnetic radiation, rotatable means to cause said beam to scan a field in space throughout a predetermined angular range, means to receive electromagnetic energy reflected from an object in space, a cathode ray tube for indicating the angular position at which said energy is received, means for creating a first field of force within said tube capable of moving the cathode ray of the tube in a first direction, means for creating a second field of force within said tube capable of moving said cathode ray in a direction perpendicular to said first direction, means to vary said fields of force simultaneously and linearly with time whereby said cathode ray is swept at a constant rate from a given point on the face of said tube towards the periphery thereof, a rotary transformer arranged to cause said first and second fields of force to vary sinusoidally and cosinusoidally, respectively, in synchronism with the rotation of said rotatable means, and means to cause the response of said receiving means to intensify said cathode ray whereby the bearing of said object relative to a given reference line is indicated.

JAMES F. KOEHLER.

REFERENCES CITED

The following references are of record in the file of this patent:

UNITED STATES PATENTS

| Number | Name | Date |
| --- | --- | --- |
| 2,135,171 | Chireix | Nov. 1, 1938 |
| 2,241,809 | De Forest | May 13, 1941 |
| 2,275,974 | Mathes | Mar. 10, 1942 |
| 2,400,791 | Tolson et al. | May 21, 1946 |
| 2,401,432 | Luck | June 4, 1946 |
| 2,403,967 | Beesignies | July 16, 1946 |
| 2,406,751 | Emerson | Sept. 3, 1946 |
| 2,406,858 | Shepherd | Sept. 3, 1946 |
| 2,409,456 | Tolson | Oct. 15, 1946 |
| 2,427,905 | Fyler | Sept. 23, 1947 |
| 2,436,655 | Locke | Feb. 24, 1948 |
| 2,468,032 | Beesignies | Apr. 26, 1949 |
| 2,471,516 | Bryant | May 31, 1949 |

FOREIGN PATENTS

| Number | Country | Date |
| --- | --- | --- |
| 859,904 | France | Sept. 20, 1940 |
| 864,375 | France | Jan. 17, 1941 |